United States Patent [19]

Saether

[11] Patent Number: 4,611,757
[45] Date of Patent: Sep. 16, 1986

[54] MIXING DEVICE FOR MIXING TWO FLUIDS, ESPECIALLY HOT AND COLD WATER

[75] Inventor: Gustav Saether, Leksvik, Norway

[73] Assignee: Lyng Industrier A-S, Vanvikan, Norway

[21] Appl. No.: 629,593

[22] Filed: Jul. 11, 1984

[30] Foreign Application Priority Data

Aug. 30, 1983 [NO] Norway .................. 833107

[51] Int. Cl.⁴ .......................................... G05D 23/13
[52] U.S. Cl. ........................ 236/12.12; 137/625.41; 236/12.17
[58] Field of Search ............. 236/12.12, 12.16, 12.17; 137/625.41

[56] References Cited

U.S. PATENT DOCUMENTS

| 796,252 | 8/1905 | Ross et al. | 137/625.41 |
| 2,017,194 | 10/1935 | Zimmerman | 236/12.17 |
| 2,984,388 | 5/1961 | Scarr et al. | 137/625.41 X |
| 3,171,441 | 3/1965 | Schonfeld | 137/625.41 X |
| 3,721,386 | 3/1973 | Brick et al. | 236/12.12 |
| 3,951,169 | 4/1976 | Loose | 137/625.41 |
| 3,987,819 | 10/1976 | Scheuermann | 137/625.41 X |
| 4,349,149 | 9/1982 | Humpert | 236/12.16 |

FOREIGN PATENT DOCUMENTS 2323841 11/1974 Fed. Rep. of Germany .
2410316 11/1975 Fed. Rep. of Germany .
  95309 11/1959 Norway .
2056627  3/1981 United Kingdom .

Primary Examiner—William E. Tapolcai
Attorney, Agent, or Firm—Wenderoth, Lind & Ponack

[57] ABSTRACT

A mixing device for mixing two fluids, in particular cold and hot water, includes a mixing valve and an enclosure which houses at least some component parts. For temperature control the device includes an electric motor which is adapted to turn a movable valve disc of the valve for controlling the temperature. A micro processor with an operating portion, display portion and control portion is provided in the enclosure in connection with a temperature sensor in the water outlet of the valve, and with the electric motor. A display shows the temperature of the fluid, and the operating portion includes two switch knobs or buttons for raising and lowering the fluid temperature. Flow control takes place by means of a turning handle. Through an eccentric linkage rotary motion of the handle is converted to a substantial linear motion of the movable valve disc.

8 Claims, 11 Drawing Figures

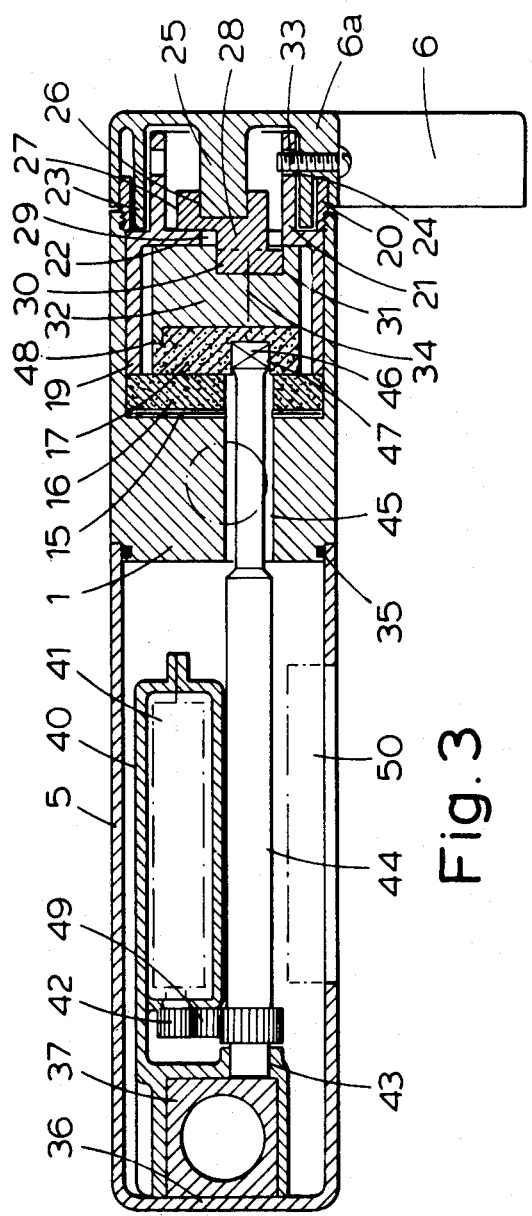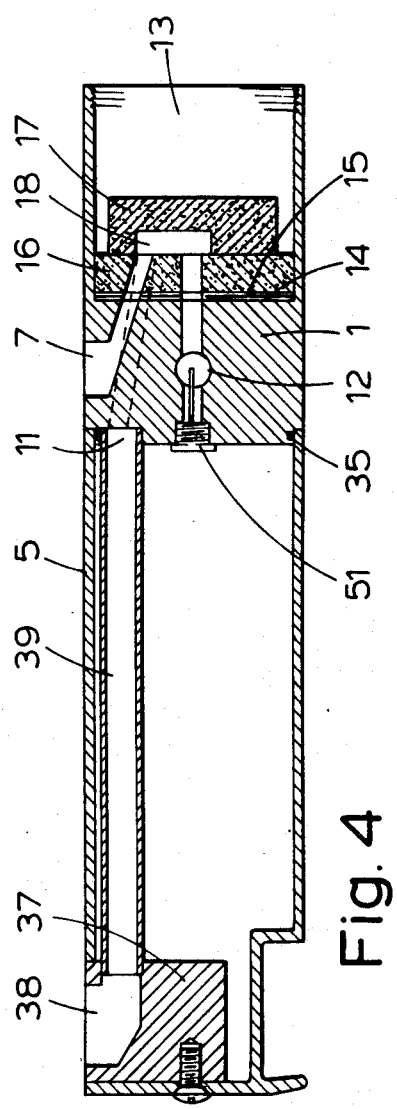
Fig. 3
Fig. 4

MIXING DEVICE FOR MIXING TWO FLUIDS, ESPECIALLY HOT AND COLD WATER

FIELD OF THE INVENTION

This invention relates to a mixing device for mixing two fluids, particularly cold and hot water, comprising a mixing valve including a valve housing having an inlet and a outlet, means for varying the amount and temperature of fluid discharged, and an enclosure that houses at least some of the component parts. The mixing valve of the device is equipped with valve discs (preferably ceramic valve discs) having passages, one disc being fixed in the valve housing and the other disc being movable for varying the temperature and the flow of the discharged water.

PRIOR ART

In devices of this type it is usual to control the temperature and flow by means of one or two handles. The amount of water flow is judged by eye, while the water temperature is felt by hand. Thermostat controlled devices have a dial for indicating the temperature.

PURPOSE OF THE INVENTION

The object of the invention is to provide a mixing device of the above mentioned type, which at any time registers the actual outlet temperature and which permits rapid adjustment of the temperature as desired.

SUMMARY OF THE INVENTION

The mixing device of the invention distinguishes itself by the features set forth in the claims.

BRIEF DESCRIPTION OF THE DRAWINGS

The invention will now be described by means of an example, and with reference to the accompanying drawings, wherein:

FIG. 3 is a larger scale sectional view of the mixing device, viewed along the line III—III in FIG. 2; FIG. 4 is a horizontal section of the device, viewed along the line IV—IV in FIG. 1, but with the turning handle and its connections removed.

DESCRIPTION OF AN PREFERRED EMBODIMENT OF THE INVENTION

Figure 2:
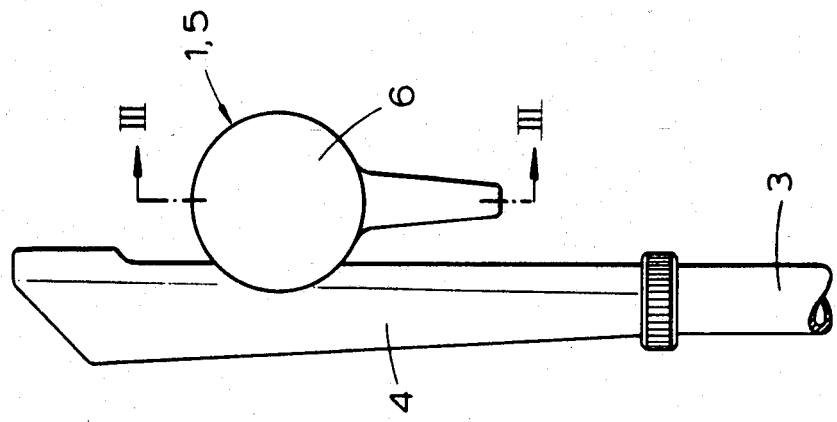
FIG. 2 is a side view of the device of FIG. 1.
Figure 1:
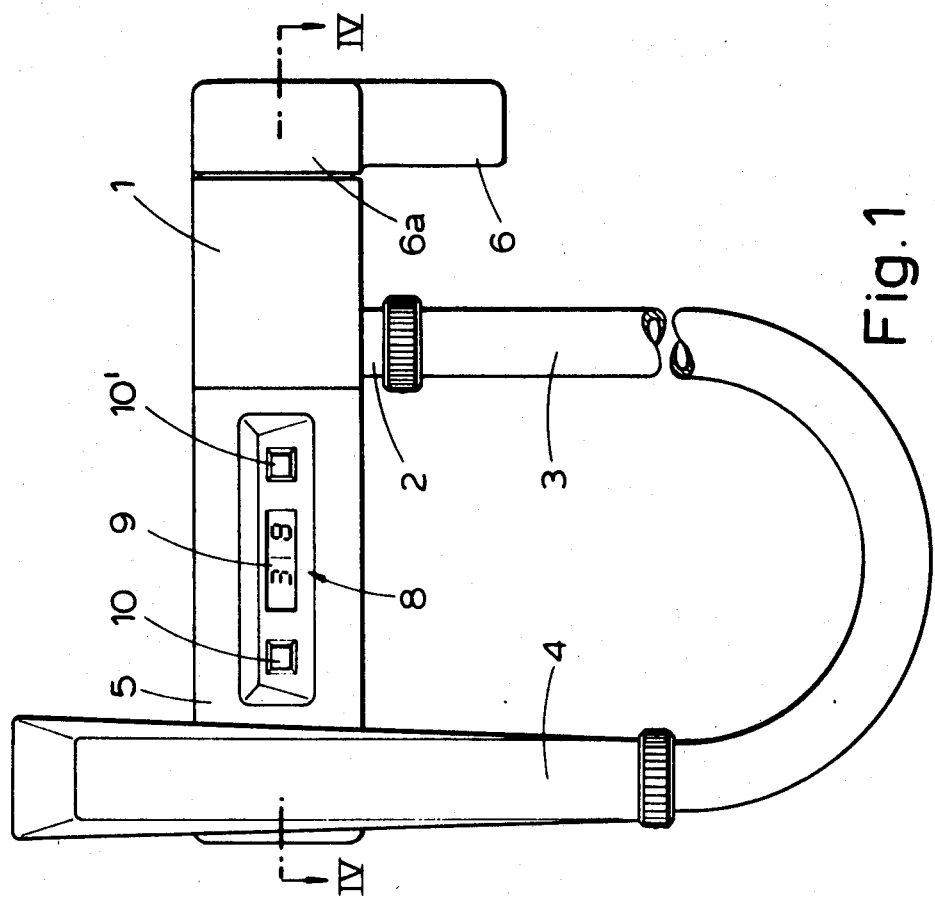
FIG. 1 is a front view of the mixing device according to an invention, arranged for a shower.

FIGS. 1 and 2 show the device viewed from the front and from the side. In FIG. 1 is shown a valve housing 1 including an outlet flange 2 with an attached hose 3 and a shower nozzle 4 suspended from a cover 5 which is fastened to the left end of the valve housing 1 (as viewed in the Figure), with a turning handle 6 including a hub 6a attached to the right end of the valve housing 1 for controlling the amount of fluid to be discharged. The mixing device in the illustrated example is designed for mixing of hot and cold water.

On the cover 5 is a panel 8 equipped with a digital display 9 that shows the instantaneous water temperature (e.g. in degrees Celsius), and with two switch knobs or buttons 10,10' located on either side of the display 9, which at the touch of a finger can cause a rise or a lowering of the temperature (to be further explained below) and thereby altering the temperature reading on the display 9.

Figure 5:
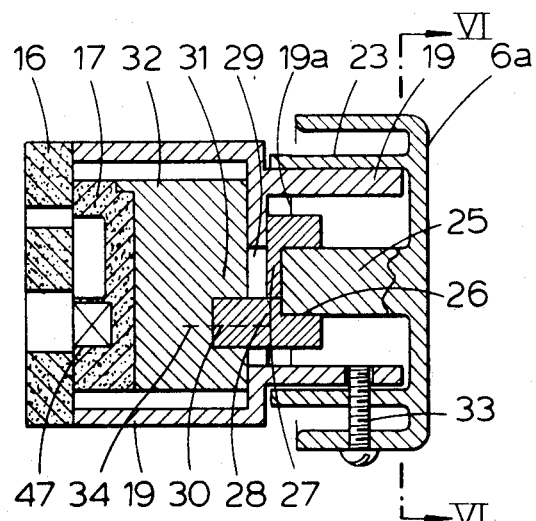
FIG. 5 is a sectional view of some details of FIG. 3, but with the valve discs in a different position.
Figure 6:
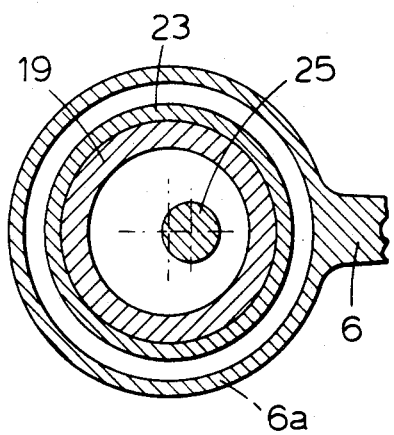
FIG. 6 is a section along the line VI—VI in FIG. 5.
Figure 7:
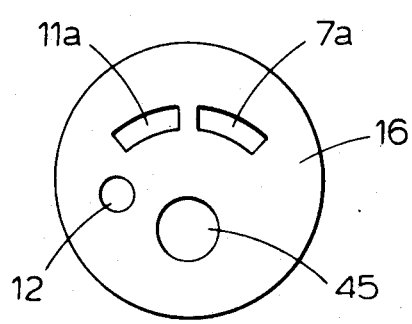
FIGS. 7 and 8 are elevation views of the valve discs viewed from the right in FIG. 5.

The construction of the mixing device will be explained further with reference to FIGS. 3–10. The valve housing 1 has inlets 7 and 11 for hot and cold water, respectively, and further an outlet 12 for mixed water. To the right (as viewed in FIG. 4) the valve housing 1 has a cylindrical bore 13 with a flat bottom 14 which is covered by a seal 15. On the seal 15 is a fixed ceramic valve disc 16 and a movable ceramic valve disc 17, the seal and the valve disc 16 being provided with suitably formed apertures 7a,11a(FIG. 7). The movable valve disc 17 has a recess 18 which permits connection of the valve housing inlets 7 and 11, by movement of the disc 17, to the outlet 12 (FIGS. 4 and 7). The use of ceramic valve discs for controlling the temperature and flow of exit water in mixing devices is known in the art, and needs no further explanation.

Figure 8:
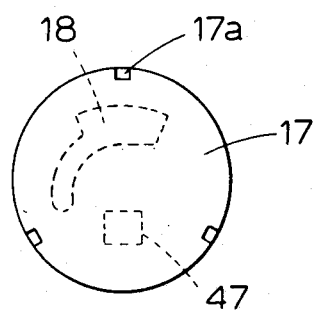
Figure 9:
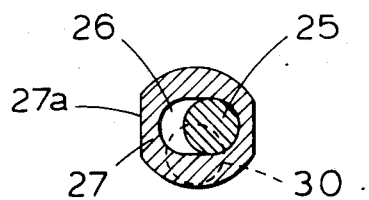
FIG. 9 is a radial section of the crank portion.
Figure 10:
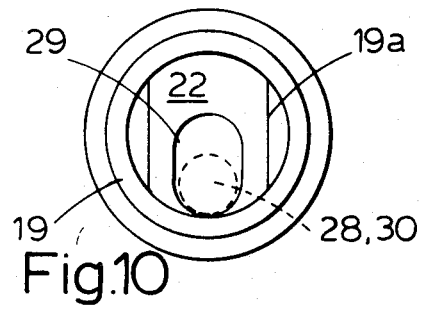
FIG. 10 is a view of the cup member from the right in FIG. 5

The fixed valve disc 16 is held in place by a cupped member 19 which is inserted in the cylindrical bore 13 and held in position by means of a threaded ring 20 which is screwed into the outer end of the bore 13. The cupped member 19 has a cylindrical hub 21 which protrudes from the bottom 22 of the cup of member 19 and which serves as a pivot for an inner cylindrical hub 23 of the turning handle 6. The hub 21 of the cup 19 is provided with a peripheral slot 24 which extends over about 180° of the circumference of the hub. The hub 6a of the handle carries an inner eccentric stud 25 facing the valve housing 1 and arranged eccentrically with respect to the axis of hubs 6a and 23 of the turning handle and to the cupped member 19 (FIG. 6). The eccentric stud 25 engages in an oval or elongated indentation 26, having a direction of elongation which is perpendicular to the plane of FIG. 3, in a crack-shaped part 27 (see FIGS. 5 and 9) having a short crank shaft 28 situated in an elongated opening 29 in the bottom 22 of the cupped member 19 (FIGS. 5 and 10). Crank shaft 28 carries a cylindrical, eccentric end stud 30 which engages in a slot or recess 31 arranged eccentrically in a cylindrical carrier 32 located in the cupped member 19. The cupped member 19 has two parallel edges 19a (FIGS. 5 and 10) that guide the crank-shaped part 27 which has two corresponding edges 27a (FIG. 9). The carrier 32 has knobs 48 (FIG. 3) in engagement with indentations 17a in the movable valve disc 17 (FIG. 8). Screwed into the hub 23 of the turning handle 6 is a radial screw 33 which extends into the slot 24 in the hub 21 of the cupped member 19, and thus limits the rotary motion of the hub 6a and the handle 6. Relative motion between the eccentric stud 25 of the turning handle 6, the crank-shaped part or portion 27 and the carrier 32 causes the movable valve disc 17 to move linearly up or down with respect to the fixed valve disc 16 (as viewed in to FIG. 3) when the turning handle 6 is turned in one or the other directions from the positions shown in FIGS. 3 and 6.

The just described motion of the turning handle, the crank portion, the carrier and the valve disc 17 serves to control the amount of water flowing through the device. The valve disc 17 and the carrier 32 have smaller outer diameters than the inside diameter of the cupped member 19, so that they do not contact the inside wall of the cupped member 19 when the amount of flow is controlled by means of the handle 6.

For controlling the temperature of the discharged water, the valve disc 17 is rotated with respect to the fixed valve disc 16. This rotary motion takes place about an axis which is eccentric with respect to the bore 13 in the valve housing and to the axis of the cupped member 19, and which is substantially coaxial with the axis 34 (FIG. 3) of the stud 30 of the crank-shaped portion 27.

As shown in FIGS. 3 and 4 cover 5 is fastened to the left hand side of the valve housing 1. A gasket 35 seals the connection. The cover is elongated and cupped. To the inside of the bottom or outer end 36 of cover 5 is fastened a block 37, having an inlet 38, through a pipe 39 which through a pipe 39 is connected with the inlet 11 of the value housing 1 by a pipe 39. Further provided in the cover 5 is a drive case 40 containing a waterproofed, encapsulated electric driver motor 41 with drive gears 42,49 and a bearing 43 for a drive shaft 44 having a gear which is engaged with the gear 49. The operating voltage of the motor 41 is in the range of from 6–12 Volt. The drive shaft 44 extends through the entire length of the cover 5, a passage 45 through the valve housing 1, corresponding openings in the seal 15 and the fixed valve disc 16, and ends in a square end portion 46 which extends into a correspondingly shaped indentation 47 in the movable valve disc 17 (FIGS. 3, 8). There is provided a clearance between the drive shaft 44 and the valve housing 1, the seal 15 and the fixed valve disc 16. Further, the bearing 43 and the indentation 47 for the square portion 46 are formed with sufficient clearance, so that the displacement motion of the valve disc 17 (as defined above) does not affect the transfer of rotary motion through the gears 42,49 for rotary motion of the valve disc 17.

Also provided inside the cover 5 is a micro computer 50 which on one side is connected to the above mentioned components 10,10' and 9 of panel 8, and with a temperature detector 51 located in the outlet 12 of the valve housing 1, and on the other side is connected with the encapsulated driver motor 41 in the driver case 40.

The operation of the device will be described with reference to the circuit diagram in FIG. 11. The computer unit comprises a control portion 54 with a regulator 52 for power supply from a connector 53. It is assumed that, with the components of the device in the positions shown in FIG. 3, the inlets 7 and 11 will supply equal amounts of cold and hot water to the valve, while the recess 18 through the movable valve disc 17 is not connected to outlet 12 which then is closed. When the turning handle 6 is turned clockwise, the valve disc 17 is displaced to connect the passage 18 in the valve disc 17 with outlet 12, and the water will flow through the valve. The display 9 will now show the water temperature at the outlet 12. If a temperature change is desired, one of the switch knobs or buttons 10,10' is pressed fo lowering or raising the temperature. The signal from the push button is converted in the computer unit 50 to a control signal for the motor 41 which starts rotating in one or the other direction. This causes a clockwise or counter-clockwise rotation of shaft 44 and thereby a corresponding motion of the movable valve disc 17 in the valve housing 1, to cause an increase in the opening of the hot water passage and a corresponding reduction of the opening of the cold water passage, or vice versa.

When the operation is concluded, the valve is closed by the turning handle 6 in the usual manner. As the eccentric stud 25 of the turning handle 6 in the closed position is at its lower "dead center point", the movable valve disc 17 has a very low velocity towards the end of its closing motion, such that the closing operation, unlike previously known designs, does not cause any appreciable shock waves or water hammer in the plumbing network.

Figure 11:
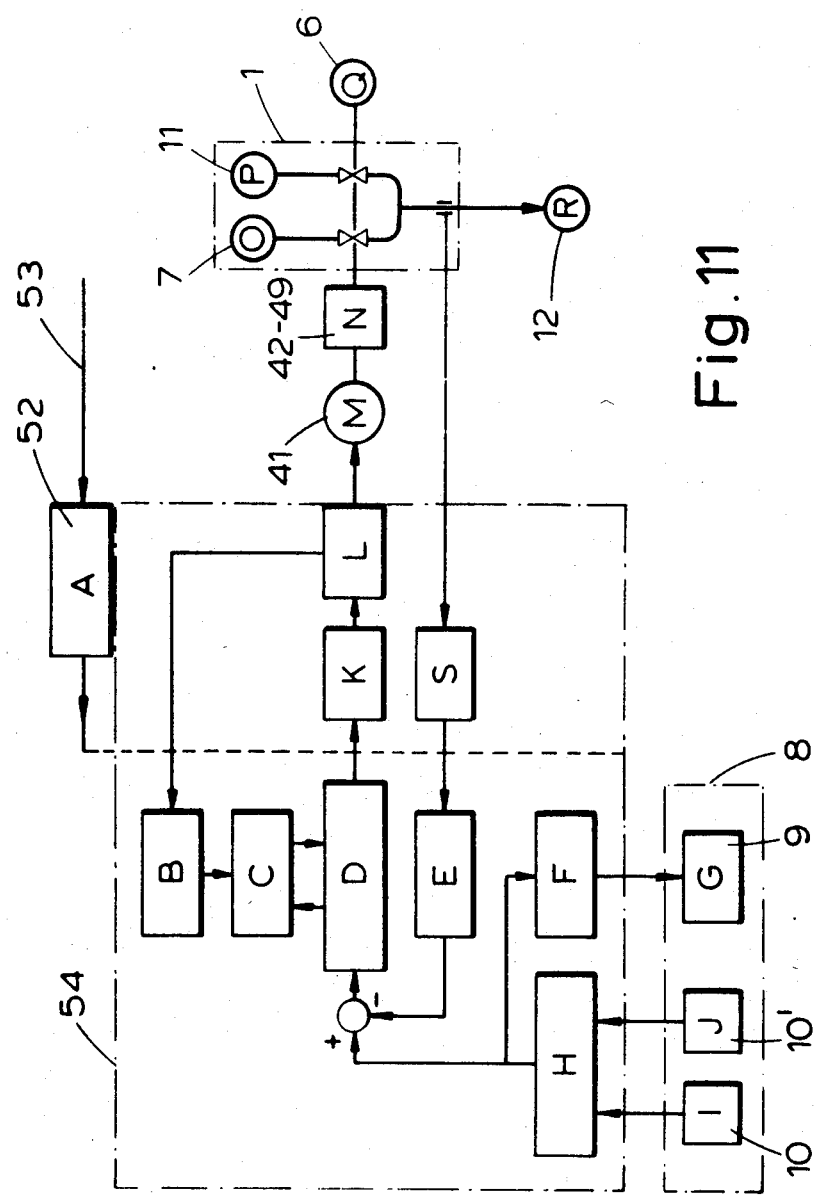
FIG. 11 is a schematic diagram of a temperature control circuit, and illustrates the layout of control portion of computer unit.

The letters A–S in FIG. 11 specify an operation and control circuit for a particular embodiment of a mixing device for hot and cold water. The letter designations are as follows:

| A. Regulator for the power supply | K. Amplifier for the motor |
| B. Analog/digital converter | L. Converter (motor current to voltage) |
| C. Direction selector for the motor | M. Electric motor |
| D. Temperature regulator | N. Gear |
| E. Analog/digital converter | O. Cold water supply |
| F. Converter/driver for display | P. Hot water supply |
| G. Display | Q. Manual opening/closing of valve |
| H. Presetting for operating point | R. Mixed water |
| I. Push buttom for raising the temperature | S. Converter (temperature to voltage. |
| J. Push bottom for lowering the temperature | |

Clearly, the invention is not limited to a mixing unit as described above and as shown in the drawings, but covers variations and modifications within the scope of the claims.

What we claim is:

1. A mixing valve for mixing two liquids having different temperatures and for controlling the volume and temperature of the mixed liquids, said mixing valve comprising:

a valve housing having two inlets for the supply of the two liquids and an outlet for the discharge of the mixed liquids;

a fixed valve disc fixed on said housing and having two inlet apertures aligned with said inlets and an outlet aperture aligned with said outlet;

a movable valve disc mounted against said fixed valve disc for rectilinear and rotary movement relative thereto, said movable valve disc having therein a recess confronting said fixed valve disc and connecting said inlet apertures;

a handle mounted on said housing for rotation relative thereto;

means operably connected between said handle and said movable valve disc, for, upon rotation of said handle relative to said housing, controlling the volume of mixed liquids discharged through said outlet by moving said movable valve disc rectilinearly between a first volume control position, whereat said recess connects said inlet apertures to said outlet aperture thereby discharging the mixed liquids through said outlet, and a second volume control position, whereat said recess is out of communication with said outlet aperture and thereby discharge of the mixed liquids through the outlet is blocked;

an electric motor mounted on said housing and having a rotatable output member; and means, operably connected between said output member and said movable valve disc, for, upon rotation of said output member selectively in opposite directions, controlling the temperature of the mixed liquids discharged through said outlet by rotating said movable valve disc in opposite directions to cause said recess to increase or decrease the relative cross-sectional areas of said inlet apertures connected to said outlet aperture.

2. A mixing valve as claimed in claim 1, wherein said fixed and movable valve discs are formed of ceramic material.

3. A mixing valve as claimed in claim 1, wherein said volume control means comprises a crank mounted in said housing for movement only in a rectilinear direction, said crank having in a first side thereof a slot elongated in a direction transverse to said rectilinear direction, said crank having extending from a second side thereof a first stud, a second stud extending eccentrically from said handle into said slot, and said first stud rotatably fitting into a recess provided in a first side of said movable valve disc eccentrically thereof.

4. A mixing valve as claimed in claim 3, wherein said temperature control means comprises a drive shaft extending with clearance through said housing and said fixed valve disc, said drive shaft having a first end connected to said rotatable output member to be rotated thereby and a second end connected non-rotatably to a second side of said movable valve disc eccentrically thereof.

5. A mixing valve as claimed in claim 3, wherein the axis of said first stud and the axis said drive shaft are substantially coaxial.

6. A mixing valve as claimed in claim 4, wherein said second end of said drive shaft has a non-circular cross-sectional configuration and fits into a recess of complementary configuration in said second side of said movable valve disc.

7. A mixing valve as claimed in claim 1, further comprising temperature sensor means for detecting the temperature of the mixed liquids in said outlet, and computer means connected to said sensor means and said motor, said computer means including display means for displaying an indicia of the temperature detected by said sensor means, and said computer means including operating means for selectively operating said motor to thereby change the temperature of the mixed liquids.

8. A mixing valve as claimed in claim 7, wherein said housing extends horizontally and has first and second horizontally spaced ends, said handle is rotatable mounted on said first end, a cover is mounted on said second end, said motor and said computer means are mounted in said cover, and said display means and said operating means are supported on a panel of said cover.

* * * * *